(12) United States Patent
Baloukas et al.

(10) Patent No.: US 10,011,140 B2
(45) Date of Patent: Jul. 3, 2018

(54) METAMERIC SECURITY DEVICES USING AN ACTIVE MATERIAL

(75) Inventors: Bill Baloukas, Montreal (CA); Ludvik Martinu, Montreal (CA)

(73) Assignee: POLYVALOR, LIMITED PARTNERSHIP, Montreal, QC (CA)

( * ) Notice: Subject to any disclaimer, the term of this patent is extended or adjusted under 35 U.S.C. 154(b) by 1453 days.

(21) Appl. No.: 13/700,761

(22) PCT Filed: Jun. 3, 2011

(86) PCT No.: PCT/CA2011/050341
§ 371 (c)(1),
(2), (4) Date: Jan. 17, 2013

(87) PCT Pub. No.: WO2011/150523
PCT Pub. Date: Dec. 8, 2011

(65) Prior Publication Data
US 2013/0147179 A1    Jun. 13, 2013

Related U.S. Application Data

(60) Provisional application No. 61/351,459, filed on Jun. 4, 2010.

(51) Int. Cl.
*B42D 25/00*    (2014.01)
*B42D 25/29*    (2014.01)
(Continued)

(52) U.S. Cl.
CPC ............. *B42D 25/21* (2014.10); *B42D 25/00* (2014.10); *B42D 25/29* (2014.10); *B42D 25/36* (2014.10);
(Continued)

(58) Field of Classification Search
USPC .......................................................... 283/83
See application file for complete search history.

(56) References Cited

U.S. PATENT DOCUMENTS

| 7,729,026 B2 * | 6/2010 | Argoitia ................. B42D 25/00 |
| | | 359/2 |
| 8,534,710 B2 * | 9/2013 | Hoffmuller ............ B42D 25/29 |
| | | 283/94 |

(Continued)

FOREIGN PATENT DOCUMENTS

| CA | 2543790 A1 | 10/2007 | |
| DE | 10200043 A1 * | 11/2003 | ............. B42D 25/00 |

(Continued)

OTHER PUBLICATIONS

PCT/CA2011/050341 international preliminary report.

(Continued)

*Primary Examiner* — Kyle R Grabowski
(74) *Attorney, Agent, or Firm* — Anglehart et al.

(57) ABSTRACT

An integrated security structure is provided employing an external source of energy to change the appearance of the structure rendering the structure more challenging to duplicate due to its complexity. The security structure includes a substrate forming part of a bank note, identification document, or other security device; an active device within the substrate changing color between at least two colors wherein a color of the substrate surrounding the active device matches one of the at least two colors to form a metameric device. At least one Interference Security Image Structure (ISIS) is configured to be metameric with a bleached state of the active device and is therefore invisible at normal incidence. Another ISIS is metameric with the colored state of the electrochromic device and consequently becomes invisible during coloration. When the whole device is tilted, both ISIS's change color while the rest of the device essentially remains the same.

19 Claims, 10 Drawing Sheets

(51) Int. Cl.
    *B42D 25/36*     (2014.01)
    *B42D 25/21*     (2014.01)
    *G02F 1/15*     (2006.01)

(52) U.S. Cl.
    CPC ............ *G02F 1/15* (2013.01); *B42D 2035/24* (2013.01); *G02F 1/1506* (2013.01)

(56) References Cited

U.S. PATENT DOCUMENTS

| | | | |
|---|---|---|---|
| 2008/0031508 A1 | 2/2008 | Baloukas et al. | |
| 2008/0198278 A1* | 8/2008 | Ludwig | B42D 25/29 349/86 |
| 2010/0253061 A1* | 10/2010 | Whiteman | B42D 25/425 283/85 |
| 2012/0061950 A1* | 3/2012 | Huang | B42D 25/00 283/83 |

FOREIGN PATENT DOCUMENTS

| | | | | |
|---|---|---|---|---|
| DE | 102006059865 A1 | 6/2008 | | |
| EP | 1936603 A1 * | 6/2008 | ............ | B42D 25/00 |
| GB | 2457666 A | 8/2009 | | |
| JP | 2004-142175 A | 5/2004 | | |
| WO | WO 2008/022972 A1 | 2/2008 | | |
| WO | WO 2008022972 A1 * | 2/2008 | ............ | B42D 25/30 |
| WO | WO 2009050448 A1 * | 4/2009 | ............ | B42D 25/425 |
| WO | WO 2010000470 A1 * | 1/2010 | ............ | B42D 25/29 |

OTHER PUBLICATIONS

Ian M. Lancaster et al., The growth of optically variable features on banknotes—Abstract, Proc. SPIE 5310, 2004, 34-45.
J. A. Dobrowolski et al., Research on thin film anticounterfeiting coatings at the National Research Council of Canada—Abstract, Applied Optics, vol. 28, Issue 14, pp. 2702-2717, 1989.
Linda Setlakwe et al., Comparative analysis of public opinion research in the U.S. and Canada—abstract, Proc. SPIE 5310, Optical Security and Counterfeit Deterrence Techniques V, 2004.
Paul G. Coombs et al., Integration of contrasting technologies into advanced optical security devices, Proc. of SPIE 5310, Optical Security and Counterfeit Deterrence Techniques V, 2004, 299-311.
Paul G. Coombs et al., Overt and covert verification via magnetic optical security devices—abstract, Proc. SPIE 4677, Optical Security and Counterfeit Deterrence Techniques IV, 2002.
PCT/CA2011/050341—International search report.
PCT/CA2011/050341—Written Opinion.
The Impact of Counterfeiting on Governments and Consumers, Business Action to Stop Counterfeiting and Piracy (BASCAP), 2009.
Thomas Martinuzzo et al., Interference Security Image Structure, Apr. 2009.
EP 11789032 Extended European Search Report with claims 1-16.

* cited by examiner

Uncolored state    Colored state

METAMERIC SECURITY DEVICES USING AN ACTIVE MATERIAL

TECHNICAL FIELD

The present invention relates to security image structures.

BACKGROUND

In accordance with findings presented in "*The Impact of Counterfeiting on Governments and Consumers, a report commissioned by BASCAP*", Business Action to Stop Counterfeiting and Piracy, 2009, counterfeiting costs the G20 countries more that a 100 billion € per year. In the never-ending race against counterfeiters, governments and institutions have, until now, maintained a suitable lead by wielding technology to their advantage; in this respect, the currency industry is an excellent example. One of the most important efforts has been to "educate" the general public to detect false bills and/or documents. Consequently, various optical security features such as holograms for example mentioned by I. M. Lancaster and A. Mitchell in "*The Growth of Optically Variable Features on Banknotes*", Proc. SPIE 5310, 34-45 (2004), Interference Security Image Structures (ISIS) mentioned by J. A. Dobrowolski, F. C. Ho, and A. Waldorf in "*Research on Thin Film Anticounterfelling Coatings at the National Research Council of Canada*", Appl. Opt., 28, 2702-2717, (1989), watermarks and micro printing mentioned by R. van Renesse in "*Optical Document Security*", Artech House, Delft, The Netherlands, 1998, 2nd ed. have been in circulation for many years.

Various ways are known to incorporate an ISIS into a banknote, a passport document, or a (security) plastic ID card. The ISI structure can be simply transferred and glued onto a surface, and this is suitable in many applications. The ISIS can also be weaved into the document or banknote substrate. It can also be printed or laminated between two transparent media (for example in the case of a window-type device).

Holograms and ISIS's are part of a specific category of devices termed iridescent, meaning that their appearance is dependent on the conditions under which they are observed. The color change as a function of the observation angle offered by ISIS inhibits reproduction by most reprographic techniques such as printing, scanning, etc. In "*Comparative Analysis of Public Opinion Research in the U.S. and Canada*", Proc. SPIE 5310, 13-24 (2004), L. Setlakwe and L. A. DiNunzio have found that this observation angle dependent optical effect has also proven to be a highly efficient means of detection by the general public. Unfortunately, iridescent consumer products are now also readily available, and may render basic interference based devices obsolete. For this reason, various solutions have been proposed, such as combining ISIS devices with holographic elements as mentioned by P. G. Coombs, A. Argoitia, V. P. Raksha, and R. W. Phillips in "*Integration of Contrasting Technologies Into Advanced Optical Security Devices*": Proc. SPIE 5310, 299-311 (2004), magnetic elements as mentioned by P. G. Coombs, V. P. Raksha and T. Markantes in "*Overt and Covert Verification via Magnetic Optical Security Devices*": Proc. SPIE 4677, 182-193 (2002), etc. Another solution has been presented in co-pending US patent application publication 2008/0031508, entitled "*Interference Security Image Structure*", published on Feb. 7, 2008, the specification of which is hereby incorporated by reference.

As defined by the International Commission on Illumination (CIE: "*Colorimetry*" International Commission on Illumination, Vienna, Austria, 2004, 3rd ed), two objects which display the same color under a specific illuminant and for a specific observer are termed metameric if their reflection or transmission spectra differ in the visible spectrum. Devices based on metamerism offer a higher performance and an extra level of security which can hence prolong the life cycle of ISIS's. In fact, by matching the color at normal incidence of an interference filter with the color of a non-iridescent material (NIM), a hidden image, which only appears as the angle of observation is increased, can be fashioned. The NIM also offers the advantage of serving as a color reference making detection much easier including for observers with color vision deficiencies.

SUMMARY

In order to increase the anti-counterfeiting performance of Interference Security Image Structures (ISIS), implementing an active component using an electrochromic, thermochromic, photochromic, or piezochromic material is proposed.

The proposed solution includes combining an active device with a metameric ISIS. Contrary to most present-day passive devices, this novel combination will lead to the addition of an active mode of authentication, i.e. an external source of energy is required in order to change the appearance of the device.

In some embodiments, this novel device is based on metamerism and offers a possibility of creating various surprising optical effects. It can therefore be more challenging to duplicate due to its complexity and adds a second level of authentication. For example, the following describe configuring optical filters to match the bleached and the colored states of the electrochromic device, in this way one can obtain two hidden images, one appearing when the device is tilted, and the other disappearing when the device is colored under an applied potential.

Specifically, in accordance with the proposed solution, an example of a filter which is metameric with the colored state of the active device demonstrates how the dynamic nature of the device offers more fabrication flexibility, and increases its performance. A design methodology is described for metameric filters based on a luminous efficiency curve of the human eye: this approach results in filters with a lower number of layers and hence lower fabrication costs, and with a lower color difference sensitivity under various illuminants and for non-standard observers.

In accordance with an aspect of the proposed solution there is provided an integrated security structure comprising: a substrate forming part of a bank note, identification document, or other security device; an active device within said substrate changing color between at least two colors; and wherein a color of said substrate surrounding said active device matches one of said at least two colors to form a metameric device.

In accordance with another aspect of the proposed solution there is provided an integrated security structure comprising: a substrate forming part of a bank note, identification document, or other security device; and a plurality of thin layers within said substrate operable as an interference device in transmission or reflection mode that changes color as a function of angle of viewing, wherein one of said thin layers comprises an active device that changes a color of said interference device as a result of an electrochromic state.

A similar effect can be achieved by using other active materials exhibiting, for example, thermochromic, photochromic, and other effects which are stimulated by the variation of energy (thermal, radiative, . . . )

While the proposed solution has typical applications to manufacturing bank notes, identification documents, or security devices, it can also be used in any article, for example for providing decoration or for improving the appearance of the article.

BRIEF DESCRIPTION OF THE DRAWINGS

The invention will be better understood by way of the following detailed description of embodiments of the invention with reference to the appended drawings, in which.

DETAILED DESCRIPTION

Figure 1:
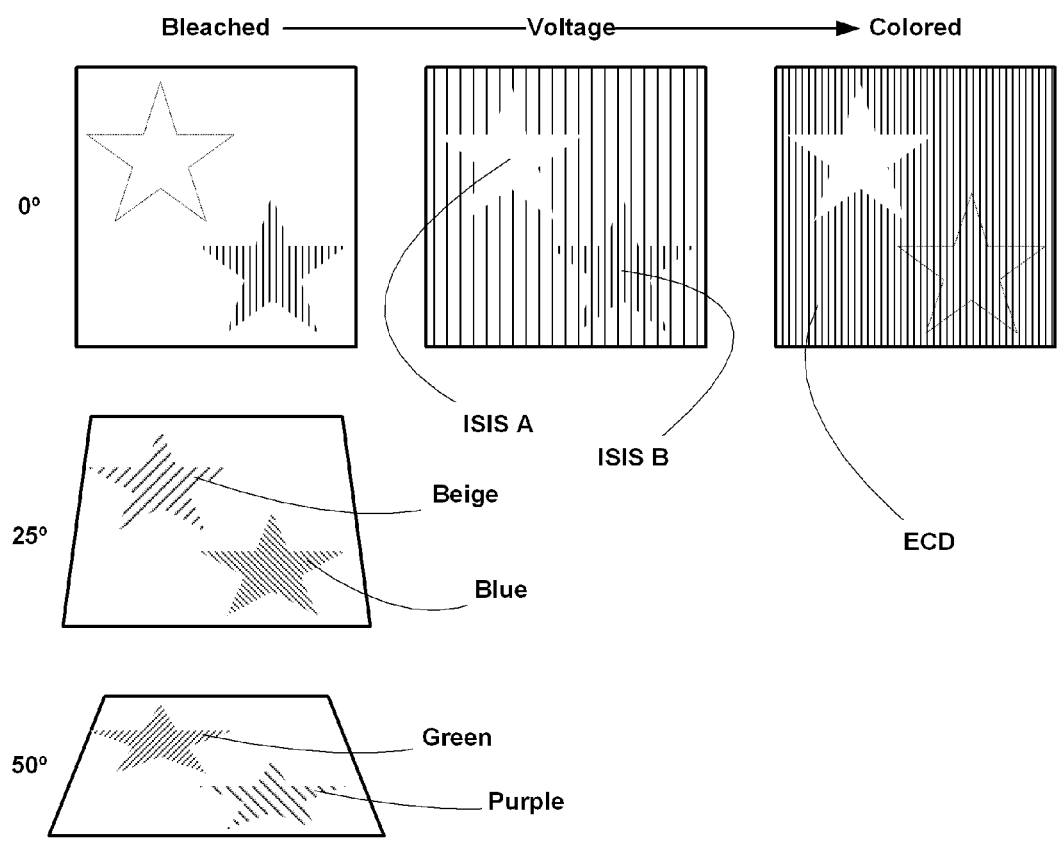
FIG. 1A is a schematic diagram illustrating an example combining ISIS's with an ElectroChromic Device (ECD)
FIG. 1B is a schematic diagram of an exemplary device structure having both ISIS and ElectroChromic properties (ECD)
Figure 1A:
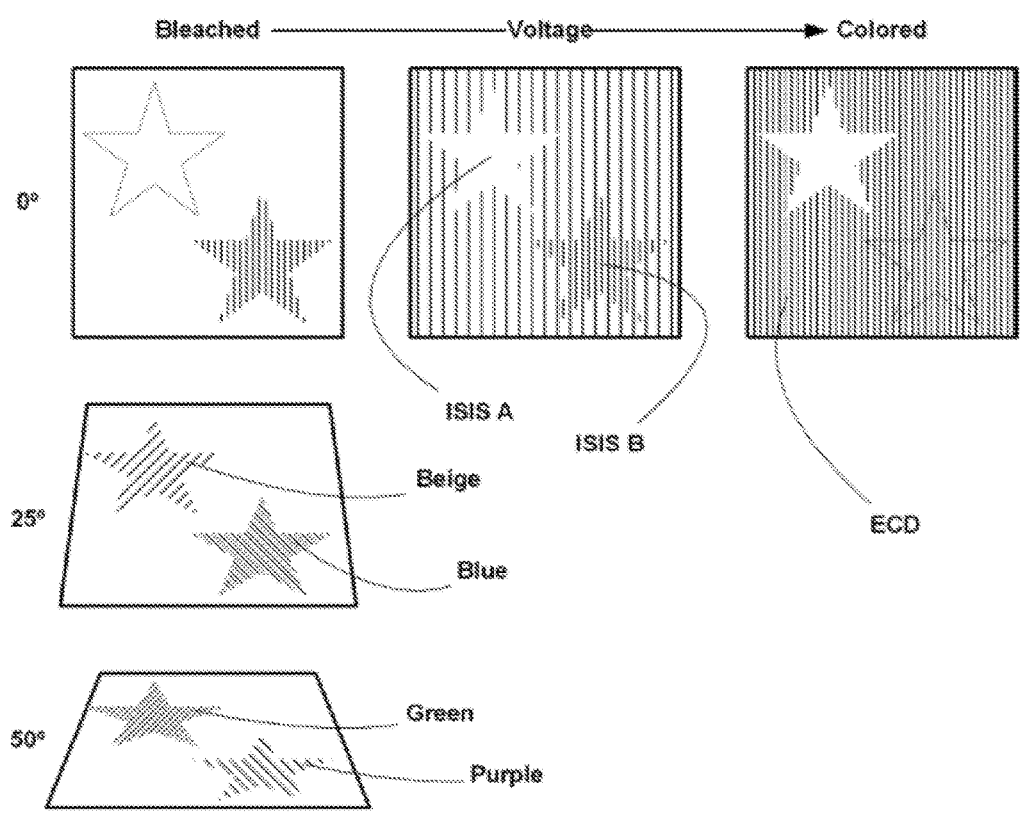

According to a discussion presented by P. M. S. Monk, R. J. Mortimer and D. R. Rosseinsky in Electrochromism and Electrochromic Devices, Cambridge University Press, 2007, among available active materials, ElectroChromism (EC) is a property in which the material's color can be changed by applying an electric current. The most popular inorganic EC material (C. G. Granqvist, "Handbook of Inorganic Electrochromic Materials", Elsevier, 1995) is tungsten oxide, $WO_3$. First developed for EC applications by S. K. Deb as described in "A Novel Electrophotographic System", Appl. Opt. Suppl. 3, 192-195, in 1969, $WO_3$ has been the material of choice for most current and may remain the material of choice for future applications due to its high coloration efficiency. A simplified representation of the EC reaction in $WO_3$ is given by:

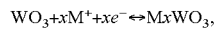

$$WO_3 + xM^+ + xe^- \leftrightarrow M_xWO_3,$$

where $e^-$ is an electron, and $M^+$ is a cation such as $H^+$, $Li^+$, etc. In the as-deposited state, $WO_3$ is a high index of refraction transparent material; however, following the insertion of ion-electron pairs, it develops a dark blue and opaque color. As described by O. F. Schirmer, V. Wittner, G. Baur and G. Brandt in "Dependence of $WO_3$ Electrochromic Absorption on Crystallinity", J. Electrochem. Soc., 124, 749-753, 1977, this coloration is due to a very wide absorption band, centered at approximately 1000 nm in amorphous $WO_3$ which essentially absorbs most of the light of the visible spectrum except in (for) the blue region.

An interesting property of EC materials is that their color is maintained after the removal of the applied potential (and therefore are said to have or exhibit a memory effect). The material can then be bleached and brought back to its initial state by applying an inverted voltage (potential). These specific properties have made EC materials likely candidates in a multitude of applications such as variable reflectivity mirrors as mentioned by D. R. Rosseinsky and R. J. Mortimer in "Electrochromic Systems and the Prospects for Devices", Advanced Materials, 13, 783-793, 2001; smart windows as mentioned by C. G. Granqvist, E. Avendan͂o and A. Azens in "Electrochromic Coatings and Devices: Survey of Some Recent Advances", Thin Solid Films, 442, 201-211, 2003; variable emissivity coatings mentioned by E. B. Franke, C. L. Trimble, M. Schubert, J. A. Woollam and J. S. Hale in "All-Sold-State Electrochromic Reflectance Device for Emittance Modulation in the Far-Infrared Spectral Region"; Appl. Phys. Lett., 77, 930-932, 2000; electronic ink mentioned by P. M. S. Monk, C. Turner and S. P. Akhtar in "Electrochemical Behavior of Methyl Viologen in a Matrix of Paper", Electrochimica Acta, 44, 4817-4826, 1999; etc. For these reasons, it is believed that EC materials are favorable candidates for future active security devices.

In accordance with the proposed solution, the combination of a metameric interference filter with the colored state of an electrochromic device is considered (ISIS B in FIG. 1) based on a structure proposed by S. K. Deb and H. Witzke in "The Solid State Electrochromic Phenomenon and its Applications to Display Devices", in Proceeding of IEEE Conference on International Electron Devices Meeting, 21 pp. 393-397, 1975 the entirety of which is incorporated herein by reference. The design, fabrication and characterization of the EC device and metameric filter are presented hereinbelow in accordance with the proposed solution along with the developed methodology for designing metameric filters, for ensuring device performance and reducing fabrication costs.

In accordance with the proposed solution, an active device offers the opportunity of having two levels of inspection. With reference to FIG. 1 the first ISIS (Star A) is matched in color with the bleached state of the EC device and thus invisible at normal incidence, while the second ISIS (Star B) matches the colored state (see FIG. 1). Consequently, simply by changing the observation angle, Star A can be made to appear, while the EC stack serves as a color reference at normal incidence. This surprising hidden image effect was presented by the inventors herein B. Baloukas and L. Martinu in "*Metameric Interference Security Image Structures*", Appl. Opt., 47, 1585-1593, 2008 the entirety of which is incorporated herein by reference. Star B also offers a color shift as a function of the observation angle, but disappears when the EC material is colored. The latter effect would be especially useful for cashiers, bank tellers or anyone having to deal with money on an everyday basis.

For example, EC devices such as illustrated in FIG. 1 were deposited on 2.5 cm by 5 cm ITO coated glass substrates from Delta Technologies with an average sheet resistivity of 50Ω/□. Part of the substrate was masked during deposition to allow access to the ITO electrode for cyclic voltammetry measurements and device testing. All ITO substrates were first cleaned with soap and de-ionized water, and in isopropanol for 15 minutes using an ultrasonic bath. For optical characterization, individual coatings were deposited on B270 glass and Si substrates.

The complete devices were deposited by radio frequency magnetron sputtering in a vacuum chamber equipped with three magnetrons fitted with $WO_3$, Si and Au targets. The base pressure was approximately $2.5 \times 10^{-6}$ Torr. The deposition conditions as well the thicknesses of each of the coatings of the individual EC device layers are given in Table 1:

| Coating | Pressure [mTorr] | Ar [sccm] | $O_2$ [sccm] | Power [W] | Thickness [nm] |
|---|---|---|---|---|---|
| $WO_3$ | 40 | 20 | 5 | 150 | ≈250 |
| $SiO_2$ | 7 | 25 | 10 | 200 | ≈150 |
| Au | 15 | 20 | — | 75 | ≈8 |

The interference filters, designed using the OpenFilters software (S. Larouche and L. Martinu, "OpenFilters: Open-Source Software for the Design, Optimization and Synthesis of Optical Filters", Appl. Opt., 47, C219-C230 2008), were deposited using a Spector II® dual ion beam sputtering system (manufactured by Veeco-Ion Tech) equipped with two Kaufman gridded ion sources. The primary 16 cm ion source was used to sputter from one of the two 35 cm diameter targets made of $SiO_2$ or Nb. The secondary 12 cm ion source was used to simultaneously bombard the growing films to increase the density of the deposited layers, according to example techniques mentioned by D. M. Mattox in "*Particle Bombardment Effects on Thin-Film Deposition: A Review*", J. Vac. Sci. Technol. A 7, 1105-1114, 1989 the entirety of which is incorporated herein by reference. Further details on the deposition conditions are presented by the inventors herein: B. Baloukas and L. Martinu in "*Metameric Interference Security Image Structures*", Appl. Opt., 47, 1585-1593, 2008; and E. Cetinorgu, B. Baloukas, O. Zabeida, J. Klemberg-Sapieha and L. Martinu in "*Mechanical and Thermoelastic Characteristics of Optical Thin Films Deposited by Dual Ion Beam Sputtering*", Appl. Opt. 48, 4536-4544, 2009) both of which are incorporated herein by reference.

In order to characterize the EC properties of $WO_3$ coatings, cyclic voltammetry measurements were performed using an Autolab PGSTAT302N potentiostat/galvanostat with a 1 M $H_2SO_4$-distilled water solution. An ITO substrate coated with $WO_3$ and with an exposed surface of 0.75 cm², a Pt foil, and a saturated calomel electrode (SCE) were used as the working, counter and reference electrodes, respectively. The measurement cell containing the acid solution was equipped with two windows allowing one to monitor the optical transmission spectra. The first window consists of the sample under evaluation, while the second window is made out of glass. The cyclic voltammetry measurements were preceded by 10 activation cycles done at a 50 mV/s scan rate between −0.6V and 0.6V. Following these cycles, 5 measurement cycles at varying scan rates (100 mV/s, 50 mV/s, 25 mV/s, 10 mV/s and 5 mV/s) were performed.

In situ transmission measurements were performed during cyclic voltammetry and device testing in order to calculate the coloration efficiency. The setup consists of a stabilized deuterium tungsten halogen light source from Ocean Optics (DH-2000) equipped with an optical fiber outlet. A series of lenses were used in order to focus the beam onto the device and to collect the transmitted beam into a second optical fiber connected to an Ocean Optics spectrophotometer (USB2000). This setup allowed measuring a complete spectrum from 380 nm to 850 nm approximately every 500 ms (30 averaged measurements of 3 ms plus signal treatment time).

Figure 2:
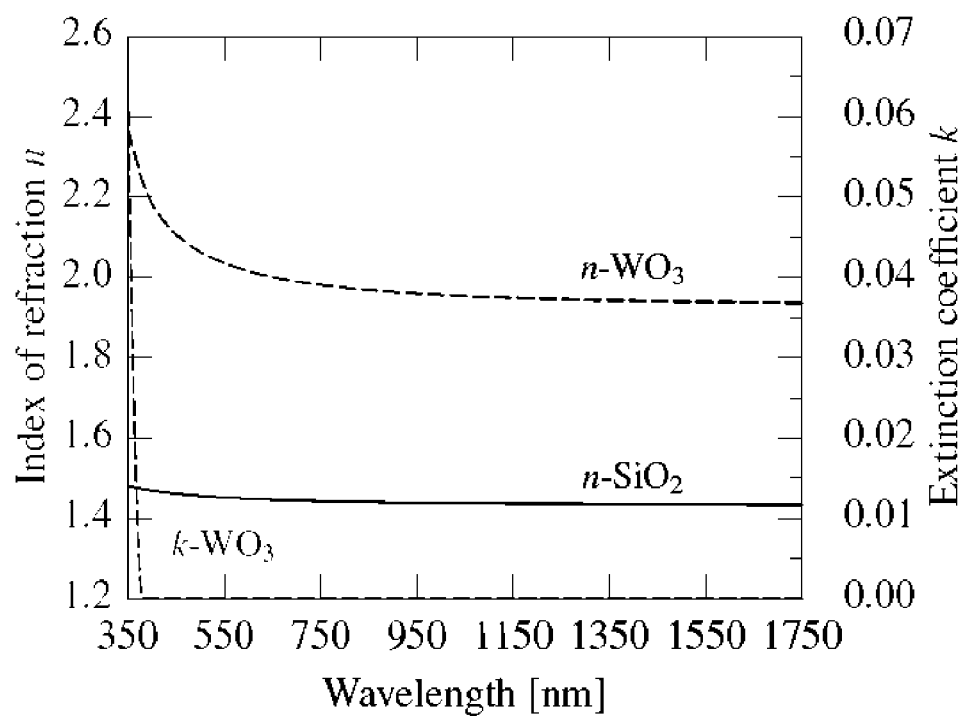
FIG. 2 is a plot illustrating optical properties of as-deposited $SiO_2$ (solid curve) and $WO_3$ (dashed curve) coatings.

Variable Angle Spectroscopic Ellipsometry (VASE, J. A Woollam Inc.) combined with transmission measurements using a Perkin Elmer Lambda 19 spectrophotometer were used to obtain the optical properties (refractive index and extinction coefficient), as well as the thickness of all deposited materials. The data was analyzed with the WVASE 32 software (J. A Woollam Inc.). FIG. 2 presents the optical properties of the deposited $SiO_2$ ($n_{550\ nm}$=1.45) and $WO_3$ coatings ($n_{550\ nm}$=2.04). The extinction coefficient of $SiO_2$ is negligible for the presented wavelengths. This is also the case for the $WO_3$ coatings for wavelengths above 380 nm.

Quantifying the color of the EC devices and interference filters is (very) important in the case of security devices. Color calculations are performed in the xyY color space and in the case of color differences in the L*a*b* color space. The color difference between object 1 and object 2 is given by:

$$\Delta E_{ab,Ith}^* = \sqrt{(L_2^* - L_1^*)^2 - (a_2^* - a_1^*)^2 + (b_2^* - b_1^*)^2}$$

where $L_i^*$, $a_i^*$, $b_i^*$ are respectively, the lightness, and color-opponent dimension of object i. I indicates the illuminant under which the color difference is calculated. In accordance with factors considered by B. Hill, T. Roger, and F. W. Vorhagen, in "*Comparative Analysis of Quantization of Color Spaces on the Basis of the CIELAB Color-Difference Formula*", ACM Transactions on Graphics, 16, 109-154, 1997, it will be considered that no color between two objects is discernable for values of $\Delta E_{ab}^* \leq 1$, In practice higher $\Delta E_{ab}^*$ values will occur. For this reason, although very slight color differences can be observed for values of $\Delta E_{ab,D65}^* \geq 2$, the threshold $\Delta E_{ab,D65}^* \leq 4$ will be considered acceptable. In fact, the most effective way to define a precise color threshold is to proceed to real-life testing under specific lighting conditions and with a variety of different observers.

Colors will be defined under the following CIE standard illuminants which represent possible environments under which a device may be inspected: D65 (average daylight with a correlated color temperature of 6500K), A (incandescent lighting) and F1 (fluorescent lighting).

Figure 3:
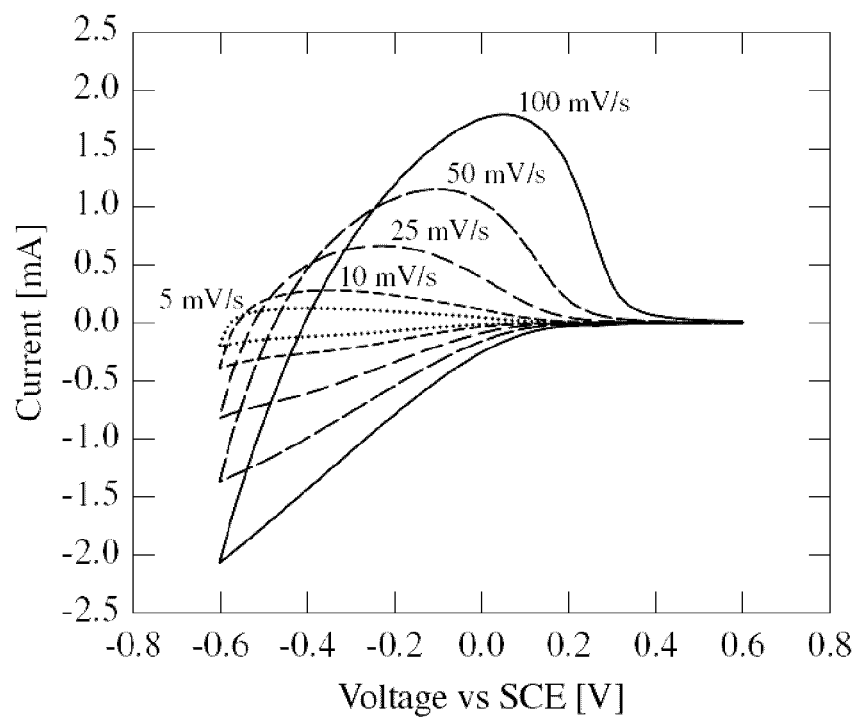
FIG. 3 is a plot illustrating cyclic voltammograms of a $WO_3$ coating at different scan rates.

The results of the $WO_3$ coating characterization by cyclic voltammetry are presented in FIG. 3; the characteristic "duck" shape obtained for $WO_3$ films can be clearly seen.

From the peak current ($i_p$) during the bleaching cycle, one can calculate the diffusion coefficient D (cm$^2$/s) using the Randles-Sevčik equation (P. M. S. Monk, R. J. Mortimer and D. R. Rosseinsky in Electrochromism and Electrochromic Devices, Cambridge University Press, 2007):

$$i_p = -0.4463 \, nFAc \sqrt{\frac{nFvD}{RT}}$$

where n is the number of electrons taking part in the reaction, F is the Faraday constant (C/mol), A the working electrode area (cm$^2$), c the solution concentration (mol/cm$^3$), v the scan rate (V/s), R the universal gas constant (J/mol·K) and T the ambient temperature (° K). Based on the observations of G. Leftheriotis, S. Papaefthimiou and P. Yianoulis in "*Dependence of the Estimated Diffusion Coefficient of Lix $WO_3$ Films on the Scan Rate of Cyclic Voltammetry Experiments*", Solid State Ionics, 78, 259-263, 2007, the lowest diffusion coefficient obtained from the 5 mV/s cyclic voltammogram, in the present case D=7.6×10$^{-11}$ cm$^2$/s, is probably the best estimate. This result is comparable to values obtained by C. G. Granqvist, "*Electrochromic Tungsten Oxide Films: Review of Progress 1993-1998*", Solar Energy Materials and Solar Cells, 60, 201-262, 2000.

Figure 4:
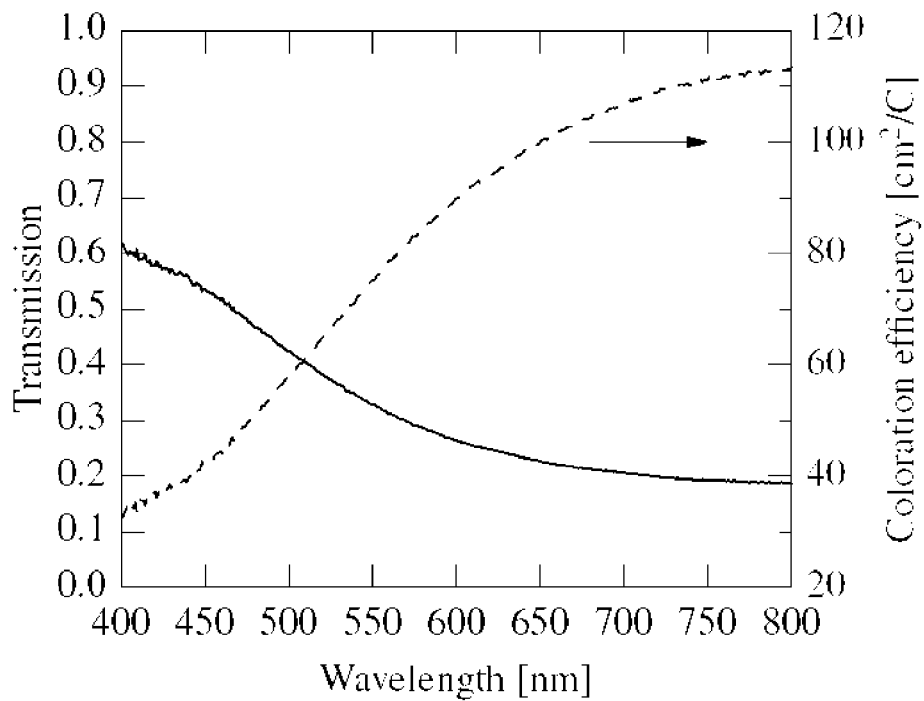
FIG. 4 is a plot illustrating transmission measurements obtained in the most colored state for a 50 mV/s cyclic voltammetry measurement and corresponding coloration efficiency (dashed curve)

In order to compare the performance of various coatings, it is useful to calculate the coloration efficiency (CE) which is directly related to the microstructure of the deposited material (C. G. Granqvist, "*Handbook of Inorganic Electrochromic Materials*", Elsevier, 1995). The CE (cm$^2$/C) is given by:

$$CE = \frac{\ln[T_b/T_c]}{[Q/A]}$$

where $T_b$ is the optical transmission in the bleached state, $T_c$ the optical transmission in the colored state, and Q (C) the inserted charge. FIG. 4 presents the optical transmission obtained in the most colored state (reference is the bleached state) during the 50 mV/s cyclic voltammetry measurement, and the resulting CE. The value of CE=75 cm$^2$/C at 550 nm is similar to that obtained by A. Subrahmanyam and A. Karuppasamy in "*Optical and Electrochromic Properties of Oxygen Sputtered Tungsten Oxide ($WO_3$) Thin Films*", Solar Energy Materials and Solar Cells, 91, 266-274, 2007.

In the following, these characteristics will be used to assess the performance of the device, while further optimization can be performed in the future.

Figure 5:
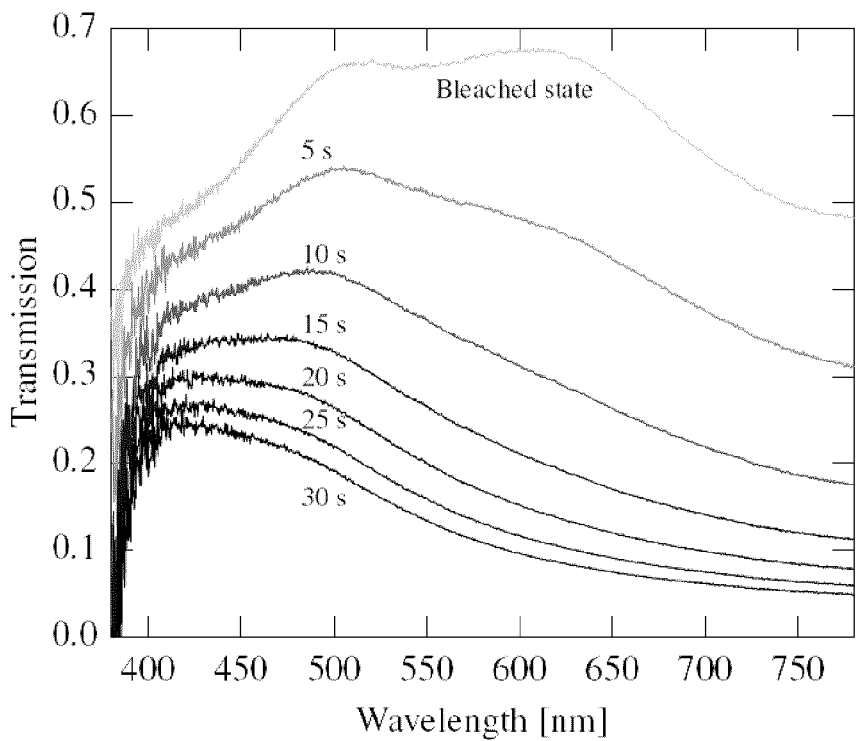
FIG. 5 is a plot illustrating a variation of the transmission spectrum of an ElectroChromic (EC) device for an applied voltage of −3V for up to 30 seconds.

In accordance with the proposed solution an EC device was fabricated following the characterization of the individual layers. With reference to Table 4 hereinbelow, the EC device is composed of an ITO-covered glass substrate, a $WO_3$ layer, a $SiO_2$ layer and a final Au layer used as an electrode (see Table 1 for the individual thicknesses of the coatings). All three layers were prepared without breaking the vacuum. This is important, since the applied voltage necessary to switch the device is highly sensitive to the quality of the top and bottom electrodes. FIG. 5 shows the variation of the transmission spectrum of the device as a function of time when a −3V potential is applied for 30 seconds. The characteristic variation of the $WO_3$ layer can be clearly seen, the maximum absorption being situated in the near infrared (outside our spectrophotometer's measuring range). Also note that the interference oscillations present in the bleached state disappear after approximately 10 seconds of coloration due to the high absorption in the $WO_3$ layer. It is also important to add that contrary to most EC systems, the present device does not contain an ion storage layer. While this simplifies fabrication, it makes the device functionality dependent on the ambient humidity; its ion source being the hydrogen in the water molecules absorbed in the $SiO_2$ layer (S. K. Deb, "*Reminiscences on the Discovery of Electrochromic Phenomena in Transition Metal Oxides*", Solar Energy Materials and Solar Cells, 39, 191-201, 1995 which is incorporated herein by reference).

Figure 6:
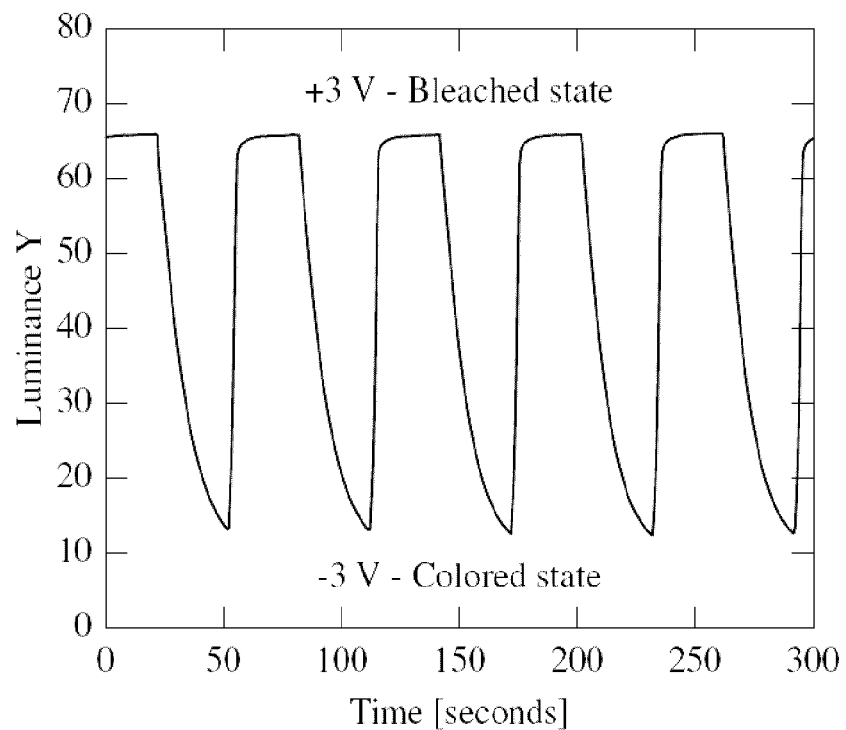
FIG. 6 is a plot illustrating luminance variation in transmission for five coloration and bleaching cycles of the EC device, wherein higher luminance values correspond to higher transmission.

To demonstrate the functionality of the device, FIG. 6 presents the variation of the luminance (Y coordinate in the xyY color space) in transmission for five coloration and bleaching cycles. The results confirm that the bleached state is recovered rapidly and completely. One also notes that the device hasn't reached its maximum coloration after 30 seconds; a lower transmission is consequently attainable.

In accordance with the proposed solution, having characterized the active system, a filter is employed which is metameric with the 20 second transmission spectrum presented in FIG. 5 corresponding to ISIS B in FIG. 1. In a specific application where a document may be verified several times a day over a period of several years, thousands of cycles can be expected and consequently the lowest transmission state for a specified coloration time can be affected due to degradation. To increase the potential lifetime of the device, the most colored state wasn't used as a color reference. Also note that a lower coloration time can be selected, but it is important to ensure a sufficiently convincing color variation between the bleached and the colored states.

The resulting metameric filter matching the colored state of the device consists of 13 layers of $SiO_2$ ($n_{550\,nm}$=1.49) and $Nb_2O_5$ ($n_{550\,nm}$=2.28) whose thicknesses are given in Table 2:

| # | Material | Thickness [nm] |
|---|---|---|
| 1 | $Nb_2O_5$ | 19.9 |
| 2 | $SiO_2$ | 88.9 |
| 3 | $Nb_2O_5$ | 48.8 |
| 4 | $SiO_2$ | 46.0 |
| s5 | $Nb_2O_5$ | 45.2 |
| 6 | $SiO_2$ | 89.9 |
| 7 | $Nb_2O_5$ | 58.6 |
| 8 | $SiO_2$ | 97.8 |
| 9 | $Nb_2O_5$ | 66.4 |
| 10 | $SiO_2$ | 104.3 |
| 11 | $Nb_2O_5$ | 60.5 |
| 12 | $SiO_2$ | 88.6 |
| 13 | $Nb_2O_5$ | 97.9 |

Figure 7:
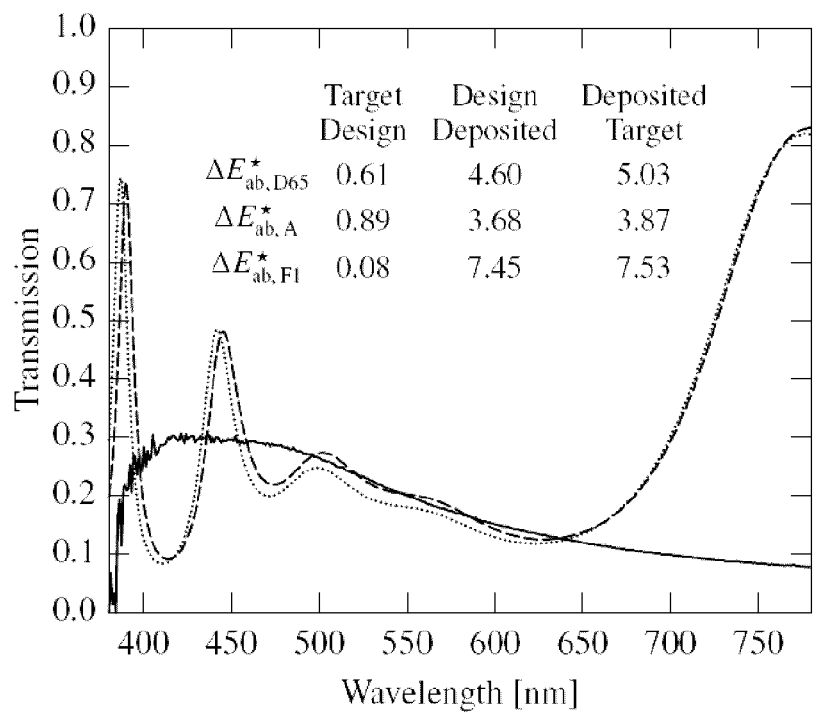
FIG. 7 is a plot illustrating transmission spectra of targets (solid curve —$WO_3$ 20 seconds coloration state), a designed filter (dashed curve) and a deposited filter (dotted curve) along with $\Delta E^*_{ah}$ values under different illuminants between the target and the design, the design and the deposited filter, and the deposited filter and the target.

More detail on the design methodology will be given below. FIG. 7 presents the transmission spectrum of the filter as well the color difference in respect to the target spectrum. Values of $\Delta E_{ab,D65}^* \leq 1$ are obtained for illuminants D65.

Figure 8A:
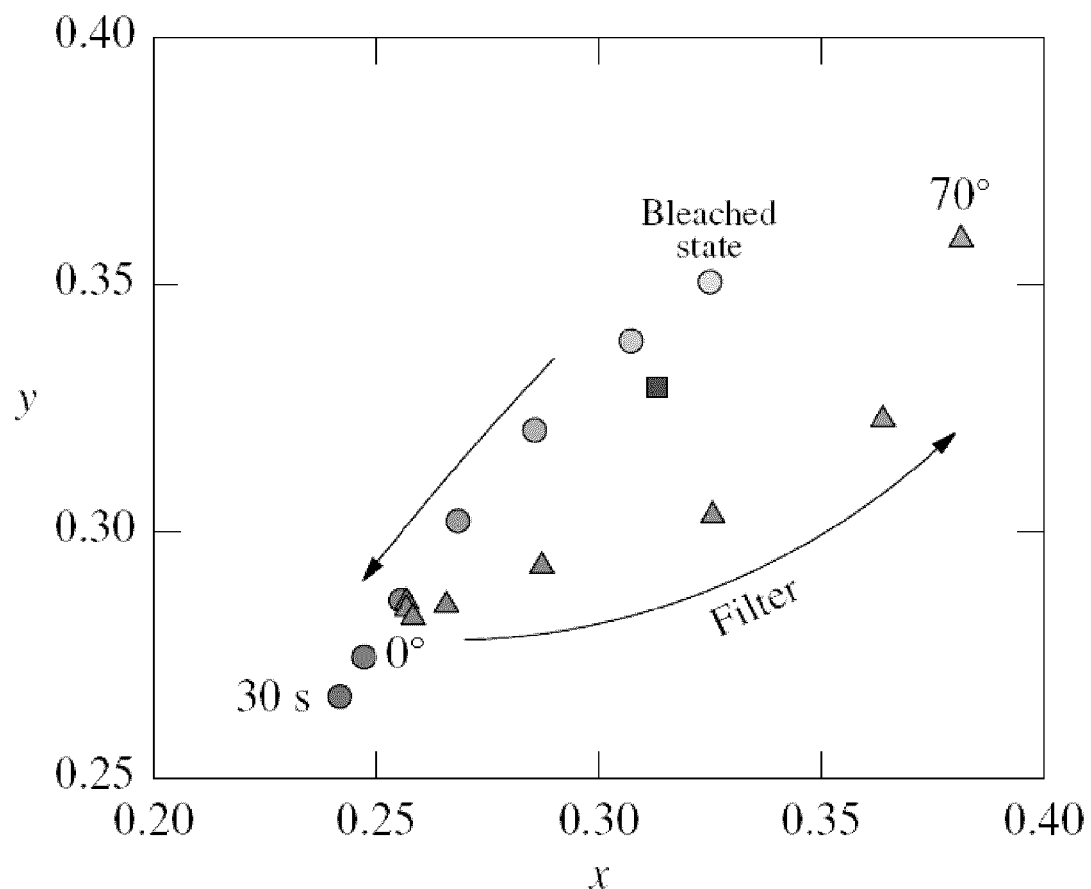
FIG. 8a is a plot schematically illustrating color variation of the EC device during coloration (circles) and of a metameric interference filter as a function of the observation angle (triangles), wherein squares represent reference white (Calculations are done under illuminant D65 in the xyY color space.)
Figure 8B:
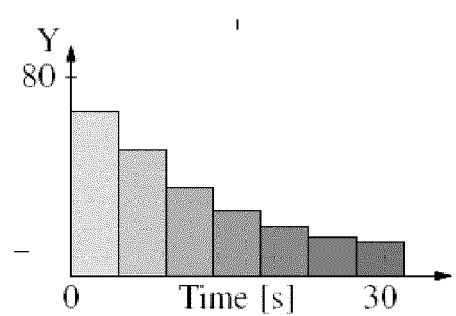
FIG. 8b is a schematic plot illustrating luminance (Y) variation with time of the EC device.

To visualize the performance of the metameric EC device, FIG. 8 presents its time and angle color variation in the xyY color space. At normal incidence both the active component and the filter show the same color at the 20 second coloration mark, but as the observation angle is increased, the filter's color varies from blue to light red. This color variation is the basis of the current passive ISIS.

Finally, the transmission spectrum of the fabricated filter is also presented in FIG. 7 (dotted curve). Since only time was used to control the thicknesses of the individual layers, slight transmission variations are expected and observed. Examples of the filter's performance are provided hereinbelow.

Figure 9:
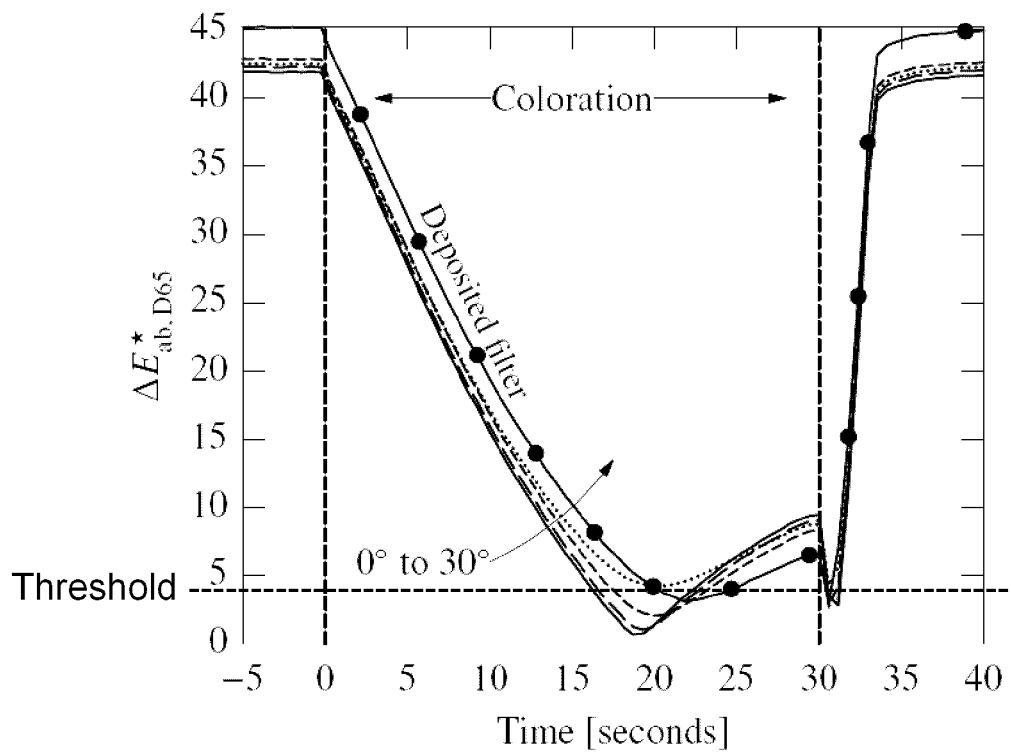
FIG. 9 is a schematic plot illustrating a theoretical color difference under illuminant D65 between the EC device and the designed filter for four angles of observation (0 to 30°) against a $\Delta E^*_{ab, D65} < 4$ threshold indicating the color matching zone.

The dynamic nature of the EC device invites one to calculate the variation of the color difference as a function of time during the coloration and the bleaching cycles. FIG. 9 presents $\Delta E_{ab, D65}*$ at four angles of observation of observation of the interference filter (the color variation of the EC stack is negligible for these angles especially in its colored state). The color difference is not at its lowest at 20 seconds since the calculations were done for a different coloration and bleaching cycle than the one used to design the filter in order to demonstrate the versatility of the device. It is interesting to note that a color match is obtained for a six second time period at normal incidence; a feature which appears important in order to ensure that the user has time to observe the color match. This time period diminishes as the angle is increased, but a color match is still possible at an angle of 30°, thus offering some leeway when observing the device. Note that the observed asymmetrical color variation is due to different coloration and bleaching mechanisms of $WO_3$ for example mentioned in P. M. S. Monk, R. J. Mortimer and D. R. Rosseinsky in Electrochromism and Electrochromic Devices, Cambridge University Press, 2007. In spite of these different mechanisms, a color match is also obtained during the bleaching cycle.

We have also observed that the dynamic nature of the EC device can compensate, to some extent, the transmission fluctuations of the deposited metameric interference filter as well as the slight color fluctuations the EC material may suffer as a function of time. In fact, in the case of our deposited filter, small deviations of the transmission, caused by thickness inaccuracies, are sufficient to increase the color difference under all three illuminants over our defined color matching threshold $\Delta E_{ab, D65}* \leq 4$ at 20 second coloration mark (see FIG. 7 and FIG. 9). Nevertheless, a minimum value of $\Delta E_{ab, D65}*=3.15$ is obtained during the coloration cycle at a time of approximately 23 seconds (see FIG. 9 where the curve with the black dots represents the color difference obtained for the deposited filter at normal incidence.). This higher time is explained by the lower transmission of the deposited filter. It is also interesting to note that a value of $\Delta E_{ab, D65}*=2.83$ obtained during the bleaching cycle. Note that in the previous analysis, it was assumed that the interference filter is stable as a function of time as presented by E. Cetinorgu, B. Baloukas, O. Zabeida, J. Klemberg-Sapieha and L. Martinu in "*Optical and Tribo-Mechanical Stability of Optically Variable Devices Deposited by Dual Ion Beam Sputtering*", Accepted for publication in Applied Optics, 2011, where various environmental tests were performed to demonstrate the color stability of a wide variety of optical filters.

In the previous example, the presented filter was metameric with the colored state of the active element (star B in FIG. 1). One could also choose to create a metameric filter with the bleached state of the device (star A in FIG. 1). In order for this configuration to work, the color of the bleached state of the EC device at normal incidence would need to be modified either by adding a colored layer on the backside of the substrate or, in a more complex way, by modifying the bleached state of the EC layer. In the case of $WO_3$, this can be done by doping with various metals such as gold, for example as described by K.-W. Park in "*Electrochromic Properties of Au—$WO_3$ Nanocomposite Thin-Film Electrode*", Electrochemica Acta, 50, 4690-4693, 2005, which is incorporated herein by reference.

A 20 second coloration time of the present device would be too long for real life applications. Various parameters can decrease the coloration time. For example, increasing the applied voltage can lead to a faster coloration but quicker degradation. Higher porosity of the $WO_3$ layer can also be considered, for example as mentioned by G. Beydaghyan, G. Bader and P. V. Ashrit in "*Electrochromic and Morphological Investigation of Dry-Lithiated Nanostructured Tungsten Trioxide Thin Films*", Thin Solid Films, 516, 1646-1650 (2008); and by C. G. Granqvist in "*Progress in Electrochromics: Tungsten Oxide Revisited*", Electrochimica Acta, 44, 3005-3015, 1999, as would a more humid environment (S. K. Deb, "*Reminiscences on the Discovery of Electrochromic Phenomena in Transition Metal Oxides*", Solar Energy Materials and Solar Cells, 39, 191-201, 1995). We estimate that times between 2 and 5 seconds should be acceptable; on the contrary, a more rapid operation wouldn't give enough time to observe the color match and therefore authenticate the protected document. Finally, replacing $WO_3$ by an organic EC material can further lower the coloration time.

In accordance with the proposed solution, a new methodology is presented which allows a reduction (diminish) in the number of layers (lower cost) while maintaining a low color difference between the filter and the noniridescent material, and a high performance under various illuminants.

At first glance, it may seem that designing a metameric filter is simple with today's software; however, in order to obtain and optimize the most efficient and performing design, it is necessary to use a series of specific steps. As an initial structure for the previously presented metameric filter (see FIG. 7), the following quarter wave "chirped" filter design was used: (0.6H0.6L)(0.8H0.8L)(HL)2(1.2H1.2L)2H, where H and L represent high and low index of refraction materials of quarter wave thickness for example $Nb_2O_5$ and $SiO_2$. These types of "chirped" filters are often used to design broadband reflectors. The following step consists in optimizing the thicknesses of the individual layers of the initial structure as a function of various specific targets such as spectrum and/or color to obtain reflection and/or transmission.

The simplest method is to use color targets based on the color coordinates of the noniridescent material (for example the EC device) under a specific illuminant (D65, A and F1 for example).

TABLE 3

Color difference for filters designed using different types of targets and methods.

| Targets | $\Delta E_{ab, D65}*$ | $\Delta E_{ab, A}*$ | $\Delta E_{ab, F1}*$ |
|---|---|---|---|
| Color D65 | 0.021 | 6.144 | 6.790 |
| Color D65, F1 | 0.031 | 4.235 | 0.002 |
| Color D65, F1, A | 0.244 | 0.019 | 0.070 |
| Color D65 + $T_{E.T.}$[a] | 2.846 | 5.351 | 3.949 |
| Color D65, F1 + $T_{E.T.}$ | 3.776 | 3.692 | 2.604 |
| Color D65, F1, A + $T_{E.T.}$ | 2.063 | 2.107 | 4.683 |
| Color D65 + $T_{I.P.T.}$[b] | 0.407 | 1.833 | 4.474 |
| Color D65, F1 + $T_{I.P.T.}$ | 0.606 | 0.949 | 0.077 |
| Color D65, F1, A + $T_{I.P.T.}$ | 0.430 | 0.462 | 0.784 |

[a]Equal tolerances.
[b]Inversely proportional tolerances.

As can be seen in Table 3, this method usually leads to excellent color matches, especially when color targets under more than one illuminant are included in the design process. However, the fact that color is defined by only three values results in a multitude of possible solutions (as defined herein above), many of which can lead to highly sensitive color differences under various light sources and observers. Interestingly, an increased number of illuminants in the design process leads to a filter which closely matches the target transmission spectrum in the 450 nm to 650 nm region as illustrated in FIG. 10a.

Figure 10:
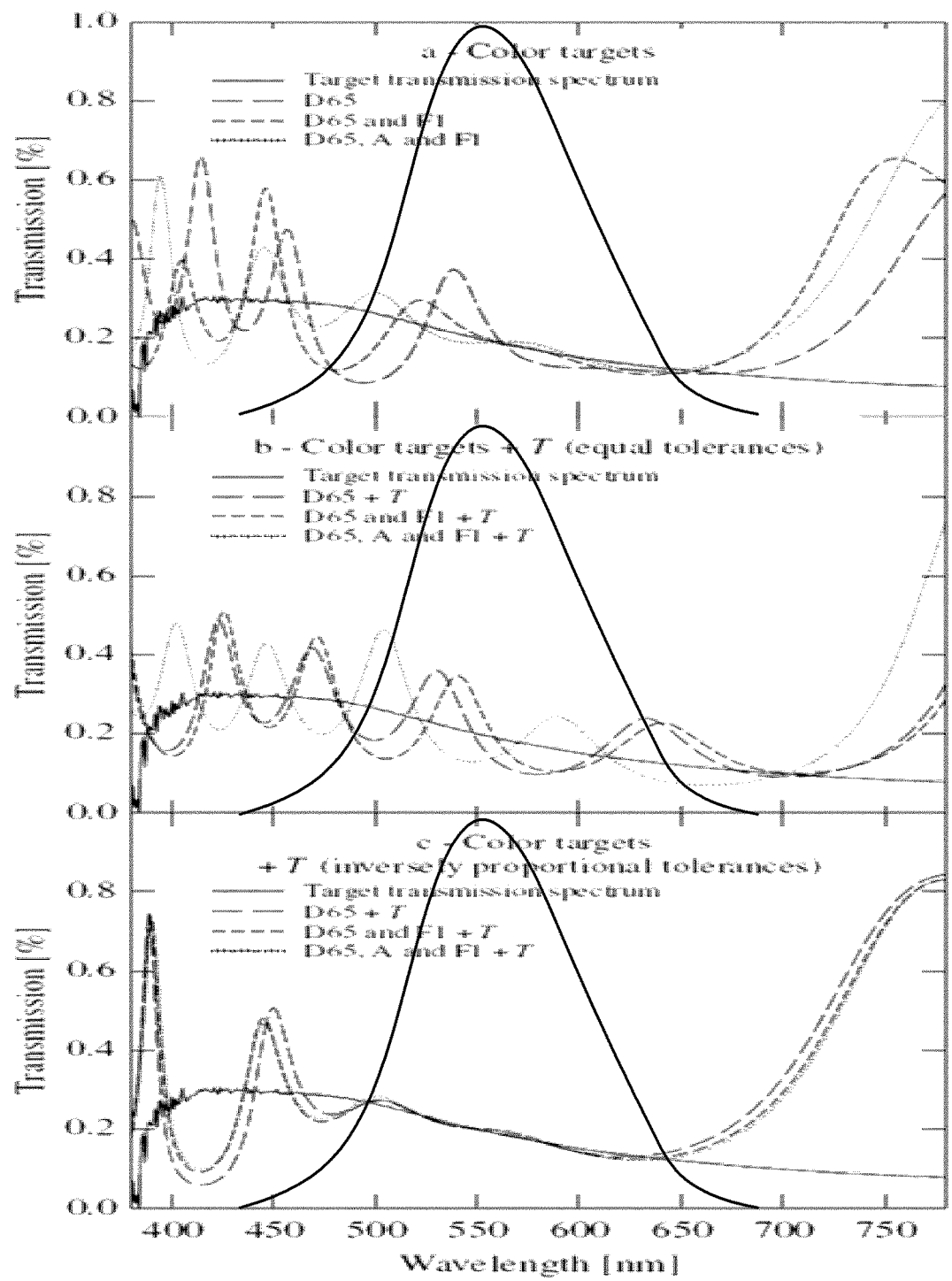
FIGS. 10a, 10b and 10c are plots illustrating a comparison of transmission spectra of various design strategies of a metameric filter, the bell shaped curve representing the luminous efficiency curve of the human eye.

To explain this effect, let us consider the luminous efficiency curve of the human eye illustrated superimposed in FIG. 10a. From this curve, one concludes that the human eye has its maximum sensitivity at 555 nm and is practically insensitive for wavelengths below 420 nm and above 680 nm. From these observations, one can infer that although color calculations are usually performed between 380 nm and 780 nm, it is the region between 420 nm and 680 nm that has the most impact. This weighing process naturally takes place when using only color targets.

Since designing a filter by taking into account all possible types of illumination is impossible, the addition of transmission or reflection spectrum targets can be very useful. In fact, this method very often leads to more efficient designs, but is also prone to creating filters with a large number of layers since multiple targets leave very little leeway during optimization. In the case of a fixed number of layers, the performance of the filter is diminished under all illuminants (see Table 3) due to large oscillations generated over the whole visual spectrum as illustrated in FIG. 10b.

Inspired by the previous observations, one way to solve these problems is to add tolerances to the spectrum targets which are inversely proportional to the luminous efficiency curve of the human eye. Doing so leads to a lower divergence between the spectra of the filter and that of the noniridiscent material in the 420 nm to 680 nm region as illustrated in FIG. 10c while maintaining low color differences (see Table 3). Essentially, this method guides the optimization in the right direction, while the color targets themselves fine-tune the spectrum to minimize the final color differences. Therefore, the risks of obtaining metameric filters which are highly sensitive to changes in illuminants and/or to non standard observers such as colorblind individuals are lowered.

As an example, a specific 13 layer quarterwave stack was used as a starting point for the refining process. Optimization targets are indicated in the figure: FIG. 10a color targets only, FIG. 10b color and equal tolerance transmission targets, FIG. 10c color and transmission targets with tolerances that are inversely proportional to the luminous efficiency curve of the human eye.

Having presented the ground work for the first combination of an ISIS with an active component, in this case an electrochromic device, such a feature could prolong the usability of ISIS devices as well increase their effectiveness by offering a surprising effect as well an additional level of security. The angle dependent color variation of the interference filter provides a quick and easy method of verification similar to present-day security devices while, in the case of the EC device, not only does it serve as a color reference for the ISIS, but it also offers an EC color shift accessible by applying a low voltage. There has been shown how the combined use of both these technologies can lead to interesting optical effects. Although the presented example is transmission based, future devices could also be used in a reflective mode. It is important to note that the presented EC device could also be replaced by any other type of EC architecture. It has also been shown that the dynamic nature of this type of system allows a certain margin of error for the deposition of the metameric filters and could also alleviate problems which could appear due to the degradation of the EC material.

Finally, it has been demonstrated that incorporating the luminous efficiency curve of the human eye into the design process results in optimal metameric filters whose color difference is stable under most light sources and ultimately for various observers. This method also offers a possibility of reducing the total number of layers of the filters. Further work will focus on modifying the color of the bleached state of the $WO_3$ coatings in order to increase the attractiveness and complexity of future devices.

The ECD described above is based on the following structure, Glass/ITO/$WO_3$/$SiO_2$/Au shown in Table 4 along with the role of each layer:

| 1 | Glass | Substrate (support) |
| 2 | ITO | First transparent electrode |
| 3 | $WO_3$ | Electrochromic material |
| 4 | $SiO_2$ | Electron barrier |
| 5 | Au | Second transparent electrode |

Figure 1B:
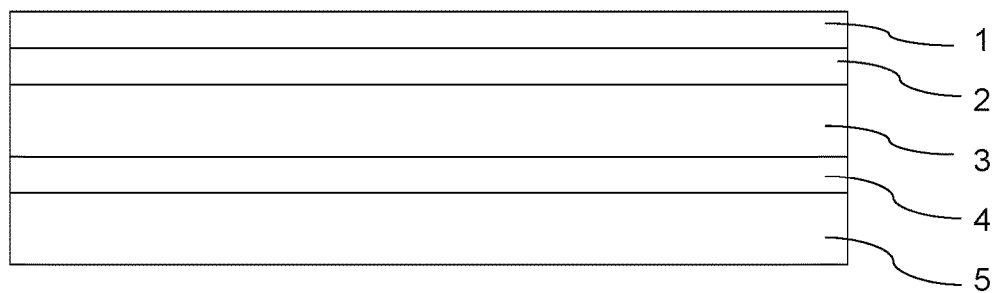

Reference is made to FIG. 1B, illustrating an exemplary structure of a device with both electrochromic and ISIS properties as shown in Table 4. In the example of FIG. 1B, the exemplary structure has a top electrode layer 1 (Au), an electron barrier 2 ($SiO_2$), an electrochromic material 3 ($WO_3$), a bottom electrode 4 (ITO) and a substrate 5 (glass).

This device requires the presence of a humid environment for it is the water which is absorbed into the $SiO_2$ layer which provides the necessary hydrogen ions for coloration. It is important to note that any other type of ECD could also be used.

In order to make the device insensitive to changes in humidity, a secondary electrochromic (EC) material can be added for example a counter EC material between layers #4 and #5 from Table 4 in which the hydrogen or lithium ions may be stored in the bleached state. $WO_3$ being a cathodic material, where the coloration occurs when charges are inserted, the counter EC material must be anodic (e.g. nickel oxide), so as to color when the charges are extracted. This complementary behavior increases the total absorption of the device and is often used to obtain a neutralized coloration for example blue of the $WO_3$ and reddish color of the nickel oxide results in a grayish color.

The electron barrier can also be replaced by a polymer. This replacement of the inorganic $SiO_2$ by a polymer allows one to deposit each of the EC layers onto two different glass or polymer substrates with an ITO layer and then glue them together using the polymer electron barrier.

It is noted that until now, inorganic EC materials have been used. Although these materials offer long term durability, their color variations are limited. Various solutions to this problem are possible:

Replace the inorganic EC material with an organic EC material (e.g. PEDOT). These materials offer a wide range of color changes as well shorter coloration and bleaching times. Some organic EC materials are even termed polychromic because they offer more than two colored states.

Modify the $WO_3$ by the addition of Au nanoparticles. These nanoparticles have been shown to modify the classic transparent to blue coloration of $WO_3$ for example the addition of an absorption band due to surface plasmon resonance.

The addition of iron oxide to the $WO_3$ coating either in solution or in the form of a multilayer structure ($WO_3$/$Fe_2O_3$/$WO_3$/$Fe_2O_3$ ...). Iron oxide has an orange color (rust) and therefore an orange to blue color shift may result from such combinations.

Depending on what type of substrate the device is apposed onto, either the transparent polymer of a credit card or polymer bill or the opaque paper of a passport, two types of modes of use are possible:

In order for the device to be used in a transmission mode, both electrodes must be transparent. Two types of electrodes are possible, very thin metallic layers (Au, Ag, Al, etc.) or doped oxides such as ITO, doped ZnO, etc.

For a reflective mode of use, one of the transparent electrodes must be replaced with a thicker metallic layer so as to eliminate any transmission. Either layer #2 or layer #5 from Table 1.

Figure 12:
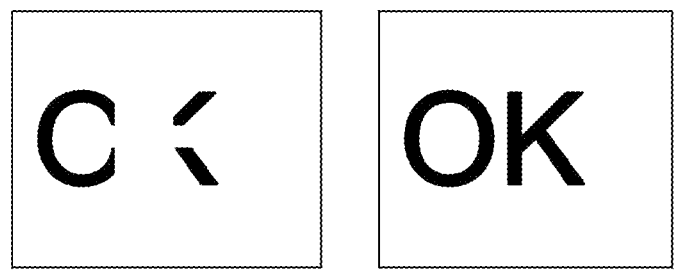
FIG. 12 is a schematic diagram illustrating an example of an opaque substrate to hide underlying information once the device is colored or to complete it and form an image or text.

One could also imagine using a transparent device onto an opaque substrate so as to hide underlying information once the device is colored or to complete it and form an image or text as shown in FIG. 12.

In this example of FIG. 12, the partial OK is printed onto the document using an ink which matches in color with the colored state of the ECD (metameric match).

In order to produce such an image (as the one presented in the previous section), one needs to pattern one of two elements, either one of the electrodes or the electrochromic material.

The combination of the ECD with an ISIS or non-iridescent material can lead to interesting possibilities such as hidden images.

Two possibilities for the creation of hidden images include:

Matching the color of the bleached state. In the case where the matching material is an ISIS, an image will appear when the device is tilted (first level of verification). In the case where the matching material is non-iridescent, one would only see an image appear when the device would be colored under an applied potential.

Matching the color of the colored state. In this case, the image would be visible in the uncolored state of the ECD, but would disappear when the ECD is colored. The ISIS color shift could still serve as a first level of verification method.

Other methods of combining both an ECD and ISIS include:

TABLE 5

Combining an ECD and ISIS in the same device

| 0 | $SiO_2$/$Nb_2O_5$ | Dielectric filter |
|---|---|---|
| 1 | Glass | Substrate (support) |
| 2 | ITO | First transparent electrode |
| 3 | $WO_3$ | Electrochromic filter: Based on alternating layers of $WO_3$ of various porosities. Varying the porosity varies the index of refraction and one is thus able to fabricate an interference filter. |
| 4 | $SiO_2$ | Electron barrier |
| 5 | Au | Second transparent electrode |

Table 5 shows two solutions, either the addition of an interference filter on the backside of the substrate or the incorporation of an electrochromic filter. In the case of a transmission mode of use, the color variation of the dielectric filter would be visible in the bleached state. In which case, a device very similar to the ones developed by the inventors in B. Baloukas and L. Martinu in "*Metameric Interference Security Image Structures*", Appl. Opt., 47, 1585-1593, 2008; and in co-pending US patent application publication 2008/0031508, entitled "*Interference Security Image Structure*", published on Feb. 7, 2008 could be fabricated using a non-iridescent material, but with the addition of an EC effect.

The use of an EC filter would offer the possibility of reducing the fabrication cost and complexity.

Other applications are possible using the structure presented in Table 4:

Variable transmission Fabry-Perot filters or any other type of filter.

In the case of the EC filter, this type of structure, under the form of an antireflective filter, could replace the simple $WO_3$ layer present in smart windows. In this case, the transmission of the window in its uncolored state would be increased.

Optically variable ink is presently based on the following structure:

| 1 | Cr |
|---|---|
| 2 | $SiO_2$ |
| 3 | Al |
| 4 | $SiO_2$ |
| 5 | Cr |

This structure is symmetrical in order to ensure that once the coating is delaminated and ground into a powder the iridescent effect will be visible no matter what side flakes fall on. Notice how similar this structure is with the ECD presented above. In fact, simply by adding a $WO_3$ coating between layers 2 and 3 and between layers 3 and 4, we obtain a Deb type device. Initial tests of the structure presented an iridescent effect and EC effect as well. Initial results were encouraging.

A difference of potential can be applied to the EC device in a variety of ways:

Solar cell present on the substrate in order to supply the necessary current.

Metallic electrodes for physically applying the potential.

Conductive ink/coating or conductive polymers can be used to provide a conductive contact between an outside surface of the substrate and the electrode layer of the ECD.

Presence of a metallic antenna on the substrate in order to create a current by induction when the device is moved over a magnetic field.

Active materials termed chromic are usually used in the visible spectrum, but one could also use a variation in the infrared as a means of authentication.

In accordance with another embodiment of the proposed solution, it has been realized that in fabricating an electrochromic filter, low and high index of refraction materials are required. While in the above description reliance has been made on a variation of the density (porosity) of the $WO_3$ films, it has been realized that decreasing the index of refraction of $WO_3$, while maintaining its electrochromic characteristics, is obtained by mixing $WO_3$ with a non-electrochromic lower index of refraction material.

Figure 11:
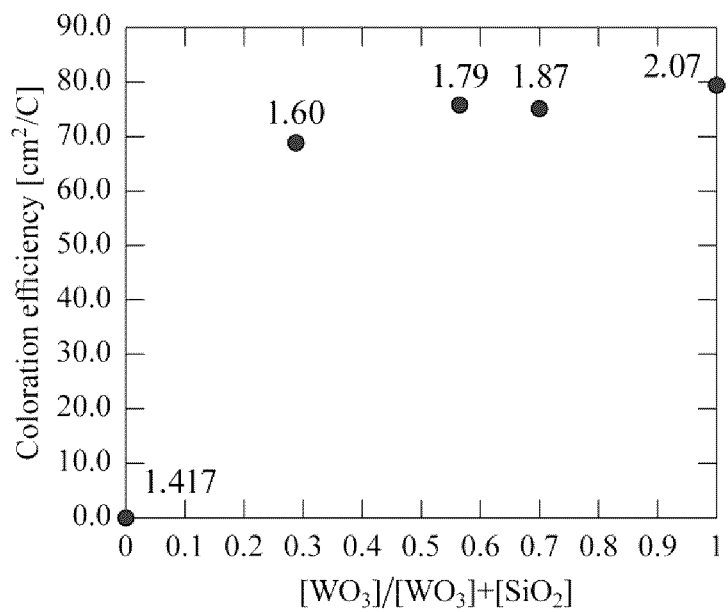
FIG. 11 is a plot illustrating coloration efficiency as a function of the $WO_3$ concentration when mixed with $SiO_2$, with the index of refraction at 550 nm is also presented for each data point.

For example, the FIG. 11 illustrates the coloration efficiency (CE) as a function of the $WO_3$ concentration in a $WO_3$/$SiO_2$ mixture. As can be seen, the CE, which is an indicator of the electrochromic performance of the material, is only slightly affected, even at low $WO_3$ concentrations (~29%). As a result, one can obtain an EC material with a refractive index of 1.60 with a coloration efficiency which is comparable to the pure $WO_3$. For certainty, the invention is not limited to $WO_3/SiO_2$ mixtures, the $SiO_2$ can be replaced by other low index of refraction materials, for example $MgF_2$, etc.

While extensive reference has been made the electrochromic characteristics, the invention not limited thereto, in fact, all of materials mentioned display a change in color under the application of an external source of energy implementing an active component using an electrochromic, thermochromic, photochromic, or piezochromic material. As a result, the proposed solution includes combining an active device with a metameric ISIS. Specifically, one can match the active material's color by configuring a metameric interference filter with one of its coloration states in order to provide an increase in anti-counterfeiting performance of Interference Security Image Structures (ISIS).

Such effect can substantially enlarge the range of optical characteristics of interference filters (discrete multilayers or graded layer systems) exhibiting electrochromic, but also possibly themochromic, photochromic and other characteristics.

What is claimed is:

1. An integrated security structure comprising:
   a substrate forming part of a bank note, identification document, or other security device; and
   a plurality of thin layers within said substrate, said plurality of thin layers comprising:
   a first electrode layer;
   a second electrode layer;
   an electron barrier layer located between said first electrode layer and said second electrode layer; and
   at least one electrochromic layer located between said first electrode layer and said second electrode layer, wherein at least one layer of said at least one electrochromic layer is adapted to at least participate in causing interference in at least one of a transmission and reflection mode, said substrate changing color as a function of angle of viewing.

2. An integrated security structure as claimed in claim 1, wherein said at least one layer of said at least one electrochromic layer is configured to cause said interference in a transmission mode.

3. An integrated security structure as claimed in claim 1, wherein said at least one layer of said at least one electrochromic layer is configured to cause said interference in a reflection mode.

4. An integrated security structure as claimed in claim 1, wherein said electrode layers are on a surface of said substrate.

5. An integrated security structure as claimed in claim 4, wherein a photovoltaic device is provided in said substrate to provide current to said first electrode layer or said second electrode layer.

6. An integrated security structure as claimed in claim 1, wherein said electrode layers are below a surface of said substrate.

7. An integrated security structure as claimed in claim 6, wherein a conductive material is provided on a surface of said substrate to provide a contact to said first electrode layer or said second electrode layer.

8. An integrated security structure as claimed in claim 1, wherein said at least one electrochromic layer form an electrochromic filter.

9. An integrated security structure as claimed in claim 8, said electrochromic filter further comprising at least one low index of refraction layer and at least one high index of refraction layer.

10. An integrated security structure as claimed in claim 8, said electrochromic filter further comprising $WO_3$ layers having different density.

11. An integrated security structure as claimed in claim 8, said electrochromic filter further comprising $WO_3$ layers having different porosity.

12. An integrated security structure as claimed in claim 8, said electrochromic filter further comprising layers having $WO_3$ mixtures with a low index of refraction material, said mixture layers having different $WO_3$ concentrations.

13. An integrated security structure as claimed in claim 12, said low index of refraction material comprising at least one of $SiO_2$ and $MgF_2$.

14. An integrated security structure as claimed in claim 12, said $WO_3$ concentration being between about 20% and about 40% and said refractive index difference being between about 1.55 and about 1.70.

15. An integrated security structure as claimed in claim 12, wherein said $WO_3$ concentration is lower than 35%.

16. An integrated security structure as claimed in claim 12, wherein said index of refraction is lower than 1.7.

17. An integrated security structure comprising:
   a substrate forming part of a bank note, identification document, said substrate comprising a plurality of thin layers comprising:
   a first semi-reflective electrode layer;
   a second electrode layer;
   an electron barrier layer located next to said first electrode layer; and
   an electrochromic layer located between said electron barrier layer and said second electrode layer,
   wherein said substrate changes color as a function of angle of viewing due to interference between said first electrode layer and said electrochromic layer, and wherein said substrate changes color between at least two colors when a voltage is applied between said first electrode layer and said second electrode layer due to an electric field applied to said electrochromic material.

18. The integrated security structure as defined in claim 17, wherein said electrochromic layer is composed of $WO_3$.

19. An integrated security structure comprising:
   a substrate forming part of a bank note, identification document, or other security device comprising:
   a first electrode layer;
   a second electrode layer;
   an electron barrier layer located next to said first electrode layer; and
   an electrochromic filter located between said electron barrier layer and said second electrode layer, said electrochromic filter comprising a plurality of electrochromic layers,
   wherein said electrochromic filter also acts as an interference filter for causing interference in at least one of a transmission and reflection mode, changing color of said substrate as a function of angle of viewing.

* * * * *